US009135673B2

(12) United States Patent  (10) Patent No.: US 9,135,673 B2
Chalamala et al.  (45) Date of Patent: Sep. 15, 2015

(54) DIGITAL WATERMARKING

(71) Applicant: Tata Consultancy Services Limited, Mumbai Maharashtra (IN)

(72) Inventors: Srinivasa Rao Chalamala, Madhapur (IN); Krishna Rao Kakkirala, Madhapur (IN); Jyoti Beniwal, gurgaon (IN)

(73) Assignee: Tata Consultancy Services Limited (IN)

( * ) Notice: Subject to any disclaimer, the term of this patent is extended or adjusted under 35 U.S.C. 154(b) by 337 days.

(21) Appl. No.: 13/689,830

(22) Filed: Nov. 30, 2012

(65) Prior Publication Data

US 2014/0023225 A1    Jan. 23, 2014

(30) Foreign Application Priority Data

Jul. 23, 2012   (IN) .......................... 2106/MUM/2012

(51) Int. Cl.
*G06K 9/00*    (2006.01)
*G06T 1/00*    (2006.01)

(52) U.S. Cl.
CPC ............... *G06T 1/0021* (2013.01); *G06T 1/005* (2013.01)

(58) Field of Classification Search
CPC .............................. G06T 1/0021; G06T 1/005
See application file for complete search history.

(56) References Cited

U.S. PATENT DOCUMENTS

| | | | |
|---|---|---|---|
| 6,625,295 B1 * | 9/2003 | Wolfgang et al. | ............. 382/100 |
| 7,218,753 B2 | 5/2007 | Macy et al. | |
| 7,424,128 B2 | 9/2008 | Iwamura et al. | |
| 7,886,151 B2 | 2/2011 | Delp et al. | |
| 8,094,871 B2 | 1/2012 | Kim et al. | |
| 8,488,110 B2 * | 7/2013 | Hug et al. | .................... 356/5.01 |
| 2002/0131617 A1 * | 9/2002 | Pelly et al. | .................... 382/100 |
| 2002/0141611 A1 * | 10/2002 | Keating et al. | ................ 382/100 |
| 2007/0036357 A1 * | 2/2007 | Van der Veen et al. | ........ 380/246 |
| 2011/0188703 A1 * | 8/2011 | Yang et al. | .................... 382/100 |

OTHER PUBLICATIONS

Abbas, Tawfiq A., et al., "Watermarking Robust Against Dropping Frame", (Nov. 5, 2011), 7 pgs.

Thanki, Rohit M., et al., "Robustness of Correlation Based Watermarking Techniques Using WGN against Different Order Statistics Filters", International Journal of Computer Science and Telecommunications [vol. 2, Issue 4, Jul. 2011], 45-49.

* cited by examiner

*Primary Examiner* — Avinash Yentrapati (74) *Attorney, Agent, or Firm* — Schwegman Lundberg & Woessner, P.A.

(57) ABSTRACT

System(s) and method(s) for embedding and extracting a watermark from a digital media are described. The method may include generating a plurality of random patterns where the plurality of random patterns includes at least a primary random pattern and a secondary random pattern. The random patterns are indicative of patterns to be embedded to the digital media. The method may further include converting at least the primary random pattern and the secondary random pattern to a bipolar form. The primary random pattern and the secondary random pattern thereof are converted to a primary bipolar random pattern and a secondary bipolar random pattern. The method may also include embedding one or more of the primary bipolar random pattern and the secondary bipolar random pattern in the digital media as the watermark based on a watermark ID, where the watermark ID is a random pattern.

19 Claims, 4 Drawing Sheets

DIGITAL WATERMARKING

CLAIM OF PRIORITY

This application claims the benefit of priority under 35 U.S.C. §119 of Indian Patent Application Serial Number 2106/MUM/2012, entitled "DIGITAL WATERMARKING," filed on Jul. 23, 2012, the benefit of priority of which is claimed hereby, and which is incorporated by reference herein in its entirety.

TECHNICAL FIELD

The present subject matter relates, in general, to watermarking and, in particular, to digital watermarking.

BACKGROUND

Digital media is a form of electronic media where data is stored in digital form. Development of technology has facilitated easy copying and transmission of digital media due to which digital media can be easily manipulated, distributed, and rendered (played) by devices, such as video players and computers, and is easily transmitted over computer networks. Due to digital media being pervasive and easily manipulated, illegal activities, such as unauthorized distribution, duplication and modification are becoming more prevalent and are subsequent to digital piracy. Hence, techniques to protect owner's right of the digital media are in demand.

Digital watermarking is used as a means to protect owner's right. Digital watermarking is a technique of embedding copyright information into digital media. The copyright information which is embedded in digital media is known as watermark. Watermarks are intended to be imperceptible to the end user of the digital media. Digital watermarking provides copyright protection, authentication, and content tracking information. Due to these widespread advantages, digital watermarking is utilized in a gamut of applications, such as image and audio protection, and video piracy preservation.

In audio/video watermarking, watermark is embedded in an audio/video media, in order to protect the media from illegal copying and to identify manipulations. The watermark is embedded using an algorithm and is perceptible to watermark-reading software only. Digitally watermarked media generally undergoes some modification after the time it is embedded. The modifications may be due to alterations done to the media or due to illegal distribution, copyright violation, etc. of the media. These modifications are commonly called as "attacks" and they degrade the quality of the watermark embedded in the media and render watermark's detection more difficult. Attacks are generally classified into unintentional and intentional attacks, wherein the intentional attacks are made during attempts to misuse or illegally distribute the media, undertaken by pirates. Intentional attacks generally have the objective to render the detection of watermark difficult. Unintentional attacks can be scaling, cropping, compressing, etc., of the digital media without any malicious intent of the doer. The common attacks of video watermarking are frame dropping, frame averaging, lossy compression, cropping, and various signal processing and geometrical attacks. It is desirable that watermark always remain in digital media, even if the digital media is subjected to such varied and different attacks.

SUMMARY

This summary is provided to introduce concepts related to embedding and extracting a watermark from a digital media, which is further described below in the detailed description. This summary is not intended to identify essential features of the claimed subject matter nor is it intended for use in determining or limiting the scope of the claimed subject matter.

In one embodiment of the present subject matter, method(s) and system(s) for embedding and extracting a watermark from a digital media are described. The method for embedding a watermark in a digital media may include generating a plurality of random patterns where the plurality of random patterns includes at least a primary random pattern and a secondary random pattern. The random patterns are indicative of patterns to be embedded as watermark in the digital media. The method may further include converting at least the primary random pattern and the secondary random pattern to a bipolar form. The primary random pattern and the secondary random pattern thereof are converted to a primary bipolar random pattern and a secondary bipolar random pattern. The method may also include embedding one or more of the primary bipolar random pattern and the secondary bipolar random pattern as the watermark in the digital media based on a watermark ID where the watermark ID is a random pattern.

In another embodiment of the present subject matter, method for extracting the watermark from a watermarked digital media is described. The method may include processing a primary bipolar random pattern and a secondary bipolar random pattern based on the attacks made to the watermarked digital media by the pirate, to generate a primary template and a secondary template respectively, where one or more of the primary bipolar random pattern and the secondary bipolar random pattern were used as the watermark in the watermarked digital media. The method may further include correlating the primary template and the secondary template with subframes of the watermarked digital media to compute a peak-to-sidelobe-ratio (PSR) with respect to each of the primary template and the secondary template. The method may also include detecting one of the primary bipolar random pattern and the secondary bipolar random pattern embedded as the watermark in at least one subframe of the watermarked digital media based on the computed PSR to extract a watermark ID, wherein the watermark ID is used to watermark a digital media to generate the watermarked digital media.

BRIEF DESCRIPTION OF DRAWING

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

System(s) and method(s) for digital watermarking are described herein. In the system and method, a watermark is embedded and extracted from digital media such that extracted watermark is robust against modifications/alterations (attacks) and computational time to detect the watermark and pirate is significantly reduced. As would be understood by those skilled in the art, the term 'digital media' has been used to include video, image, audio, and multimedia media. Further, the term 'watermark' will be understood to include symbols, image, data, instruction, and other information for identifying owner of the digital media.

Digital watermarking is a technique of embedding watermark in the digital media. Digital watermarking allows users to legally use the digital media, while adding security to the digital media to prevent illegal usage. Generally, there are three main processes involved in the digital watermarking, namely, insertion (embedding) of watermark, detection of watermark and removal (extraction) of watermark. The digital media may be copied, or illegally used by a pirate by way of different attacks or operations such as cropping, compression, rotation, scaling, and so on. As a result of such actions, the watermark embedded to the digital media may be altered or modified. However, it is important that the embedded watermark survives such various modifications, commonly known as attacks, to which the media is subjected to. Most common attack on digitally watermarked media is frame dropping. Frame dropping occurs when frame rate of digital media is modified, i.e., some frames are removed/altered from the digital media. Frame dropping causes synchronization mismatch and, an extracted watermark is difficult to match with the original watermark when there is no synchronization.

For the purpose of providing efficient copyright protection, digital watermarking technique should meet the criteria of imperceptibility as well as robustness against all attacks. A watermark is robust if it is detectable even if it is subjected to unintentional and intentional attacks, such as frame dropping, cropping, compression, and so on. However, while designing robust watermark, computational complexity of the watermark extraction should be considered. For example, watermarking algorithm should be such that less computational time is required to detect watermark and find the pirate.

Various robust video watermarking methods have been proposed to solve the illegal copying and, to validate proof of ownerships as well as to identify manipulations. However, these methods are not precise to extract the watermark under frame drop attack with reduced bit error rate. Further these methods lack capability to provide efficient pirate tracing method for proof in a court of law. Additionally, techniques providing robust video watermarking have such computational overheads that these methods take long durations to find the pirate of digital media among several people to whom digital media is distributed, resulting in limitation to usefulness of digital watermarking.

Accordingly, the present subject matter discloses systems and methods for embedding and extracting a watermark from digital media. The systems and methods provide for embedding a watermark in digital media in a manner that the watermark is efficiently detected and extracted from the digital media. In one implementation, the described methods provide technique to reduce computation time required for identification of a pirate. Furthermore, the methods and systems may also reduce efforts required in extracting an error free watermark from a watermarked digital media.

In one implementation of the present subject matter, user information may be obtained to generate a unique watermark ID for each user. The obtained information may be personal information such as name, address, contact number, date of birth, and the like. The user information may also be an image associated with the user. In said implementation, the generated unique watermark ID may be exclusive for every user of the digital media based on which watermark may be embedded to the digital media. The generated watermark ID can be a random pattern. A random pattern can be made of bit(s) or group of bits. A bit may be '0' or '1'. For example, "1011100" may be a random pattern of bit '0' and '1'. In one implementation, each bit of watermark ID may be a symbol of P bits to signify $2^P$ different possible combination. A digital media may be attacked by the pirate with an intent to remove the watermark from the digital media. In such situations, to identify watermark ID with reduced number of errors, the watermark ID may be encoded using error correction codes. Therefore, in another implementation, the watermark ID may be encoded using error correction coding to reduce the number of errors while extracting the watermark ID.

Although, it is possible that the watermark may be embedded in the digital media based on the encoded watermark ID, the description henceforth has been explained based on unencoded watermark ID. As described, since each bit of the watermark ID may be a symbol of P bits, based on $2^P$ possible combinations, a random pattern from among $2^P$ random patterns may be indicated by the symbol for embedding into the digital media. It would be understood by those skilled in the art that the group of bits made from the combination of '0' and '1' may form binary, hexadecimal, octal, or the like patterns however, for the sake of understanding, reference to binary patterns has been made hereinafter.

In one implementation, multiple random patterns may be generated to be embedded into a digital media as watermarks. The generated random patterns include at least two random patterns. For the sake of clarity, the two random patterns are referred to as a primary random pattern and a secondary random pattern, hereinafter. In one implementation, the generated primary random pattern and the secondary random pattern may be converted to primary bipolar random pattern and a secondary bipolar random pattern respectively before embedding into the digital media. One or more of the primary bipolar random pattern and the secondary bipolar random pattern may be embedded in the digital media based on the watermark ID. For example, for every bit '0' of the watermark ID the primary bipolar random pattern may be embedded in the digital media and for every bit '1' of the watermark ID, the secondary bipolar random pattern may be embedded in the digital media. In one implementation of the present subject matter, the digital media may be segmented prior to embedding of bipolar random patterns as watermarks based on different techniques, such as the ones described in the following embodiments. Although, it has been described that primary bipolar random pattern and secondary bipolar random pattern may be embedded to the digital media based on the watermark ID bit '0' and '1' however, in another implementation, based on a symbol of P bits, one random pattern from amongst $2^P$ different random patterns may be embedded to the digital media In one implementation, the digital media may be segmented into a number of frames. However, in another implementation, the digital media may be segmented into multiple frames and each frame may be further segmented into multiple or set of subframes. For the sake of clarity, the digital media segmented according to above described implementation is referred to as segmented digital media, hereinafter. One or more of the primary bipolar random pattern and the secondary bipolar random pattern may be embedded to the segmented digital media based on different embedding techniques, such as the ones described in the following embodiments.

In one implementation, one or more of the primary bipolar random pattern and the secondary bipolar random pattern may be embedded in each frame of the segmented digital media. In another implementation, one or more of the primary bipolar random pattern and the secondary bipolar random pattern may be embedded into some of the successive subframes while leaving the other successive frames un-embedded. Although, it has been described that one or more of the primary bipolar random pattern and secondary bipolar random pattern may be embedded to the segmented digital media based on the watermark ID however, in another implementation, one or more of the primary bipolar random pattern and the secondary bipolar random pattern may be embedded to the segmented digital media based on the encoded watermark ID to reduce the bit error rate while extracting the watermark ID.

Multiple successive subframes are left unaltered before one or more of the primary bipolar random pattern and the secondary bipolar random pattern is embedded again into next successive subframes to obtain watermarked digital media. For the sake of clarity, the unaltered frames are referred to as buffer segment, hereinafter. For example, a digital media may be segmented into 10 frames. Each of the 10 frames may further be segmented into 6 subframes such that there are a total of 60 subframes. In such a scenario, in one implementation of the present subject matter, first 2 successive subframes may be embedded with one or more of the primary bipolar random pattern and the secondary bipolar random pattern. The next 2 successive subframes may be left unaltered and then again, the last 2 subframes may be embedded with one or more of the primary bipolar random pattern and the secondary bipolar random pattern. Accordingly, one or more of the primary bipolar random pattern and the secondary bipolar random pattern may be embedded in each successive N subframes of segmented digital media while leaving successive N subframes un-embedded to obtain a watermarked digital media based on the watermark ID. For the sake of clarity, the set of successive frames are referred to as successive N subframes, hereinafter.

Further, watermarked digital media may be analyzed to determine if there are modifications and alterations (attacks) made to watermarked digital media by a pirate. The attacks can be estimated by comparing un-watermarked digital media and the watermarked digital media. If any attack is estimated then the primary bipolar random pattern and the secondary bipolar random pattern used as the watermark in the watermarked digital media are processed based on the estimated attacks to generate a primary template and a secondary template respectively.

In one implementation, peak-to-sidelobe ratio (PSR) may be computed among each of the primary template and the secondary template with all the subframes of the watermarked digital media. PSR based on correlation between the primary template and secondary template with all the subframes of the watermarked digital media may be computed to detect the presence of one or more of the primary bipolar random pattern and the secondary bipolar random pattern in the watermarked digital media. If for a subframe, the PSR of correlation with the primary template is higher than PSR of the correlation with the secondary template, presence of primary bipolar random pattern as watermark in the subframe may be detected. Similarly, detection of one of the bipolar random pattern may be done in the successive N subframes of watermarked digital media. Hence, based on correlation and computed PSR, one or more of the primary bipolar random and the secondary bipolar pattern embedded in each successive N subframes of the watermarked digital media can be detected.

In another implementation, run length of one of the primary template and the secondary template corresponding to the detected primary bipolar random pattern or the secondary bipolar random pattern in successive subframes is computed. Further, the run length of the watermarked digital media may be computed to minimize the effect of frame drop attacks and compression attacks during extraction of watermark ID. In said implementation, the run length is computed to determine the number of successive subframes for which one particular primary template or secondary template has been detected. Based on the computed run length, one of the bipolar random sequences embedded to the successive subframes is determined. In other words, the run length of the watermarked digital media may be computed to eliminate the need to identify exact number of frames for the extraction of one or more of the primary bipolar random pattern and the secondary bipolar random pattern.

For example, if the run length for a successive N subframes for primary template is greater than a pre-defined run length threshold, then it is detected that the primary bipolar random pattern was embedded in the successive N subframes of watermarked digital media. In one implementation, bit of watermark ID based on which one of the bipolar random pattern was embedded is determined from each successive N subframes of watermarked digital media. Since the embedding of primary bipolar random pattern was based on the watermark bit '0', in the above example, a corresponding bit '0' of watermark ID may be determined upon successful detection of the primary bipolar random pattern. Similarly, if the run length of secondary template is greater than run length threshold for some other N successive subframes, then secondary bipolar random pattern may be detected to be embedded in the successive N subframes of segmented watermarked digital media and correspondingly watermark bit '1' of watermark ID may be determined. As described earlier, the watermarked digital media may be attacked by the pirate with intent to remove the watermark from the digital media. Therefore, to extract the watermark robustly, i.e., with reduced number of errors, the watermark may be encoded using error correction codes. Accordingly, one or more of the primary bipolar random pattern and the secondary bipolar random pattern may be embedded to the segmented digital media based on the encoded watermark ID instead of the un-encoded watermark ID, in such situation the identified watermark ID may be may be decoded to extract the actual un-encoded watermark ID.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" is used throughout for clarity of the description and can include either a direct connection or an indirect connection.

While aspects of described systems and methods for digital watermarking can be implemented in any number of different computing devices, environments, and/or configurations, the embodiments are described in the context of the following exemplary system(s).

Figure 1:
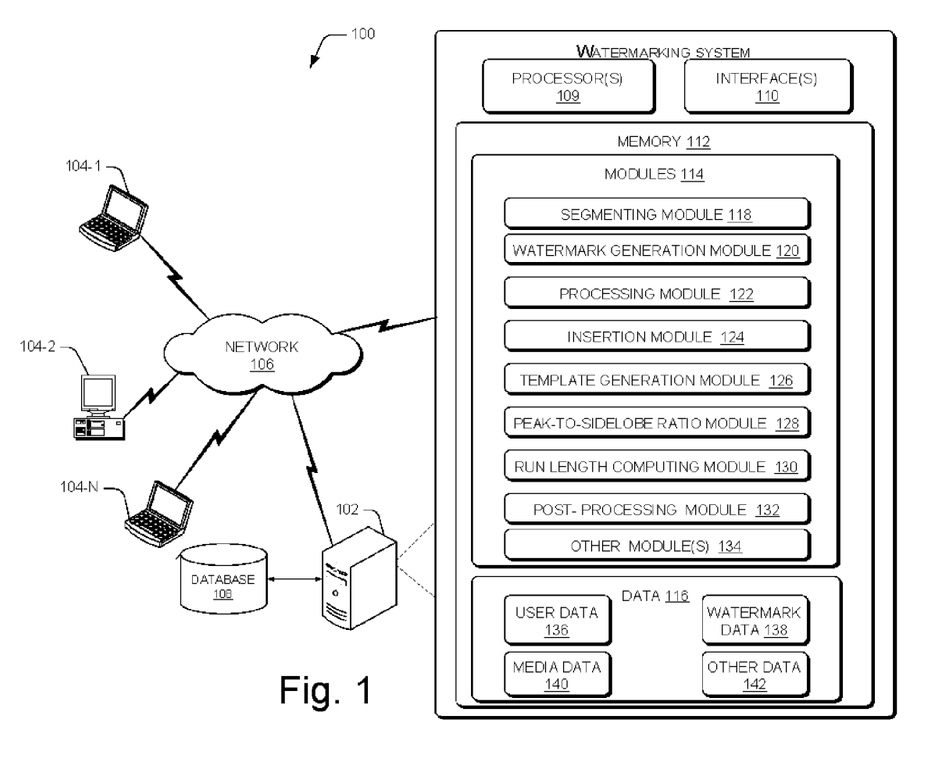
FIG. 1 illustrates a network environment, in accordance with an embodiment of the present subject matter.

FIG. 1 illustrates a network environment 100 implementing a watermarking system 102, according to an embodiment of the present subject matter. The network environment 100, apart from the watermarking system 102, includes one or more client devices 104-1, 104-2 . . . 104-N. For the purpose of explanation and clarity, the client devices 104-1, 104-2 . . . 104-N, are hereinafter collectively referred to as client devices 104 and hereinafter individually referred to client device 104. In the network environment 100, the watermarking system 102 is connected to the client devices 104 through a network 106.

The network 106 may be a wireless network, wired network, or a combination thereof. The network 106 can be implemented as one of the different types of networks, such as intranet, telecom network, electrical network, local area network (LAN), wide area network (WAN), Virtual Private Network (VPN), internetwork, Global Area Network (GAN), the Internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include a variety of network devices, including routers, bridges, servers, computing devices, storage devices.

The watermarking system 102 and the client devices 104 can be implemented as any of a variety of conventional computing devices including, for example, servers, a desktop PC, a notebook or a portable computer, a workstation, a mainframe computer, a mobile computing device, an entertainment device, and an Internet appliance. Although the watermarking system 102 and the client devices 104 are shown to be connected through a physical network 106, it would be appreciated by those skilled in the art that the watermarking system 102 and the client devices 104 may be distributed locally or across one or more geographic locations and can be physically or logically connected to each other.

The watermarking system 102, apart from other things, includes a database 108 having digital media, which is provided by the watermarking system 102 to the client devices 104. In one implementation, the database 108 may include data related to a digital media, such as image data, audio data, video data, and so on. In another implementation, the database 108 may include data associated the user data which may include personal data, accounts data, and the like. Therefore, it would be understood by those skilled in the art that the database 108 may include data related to different fields of operation depending upon the industry of implementation.

In one implementation, the watermarking system 102 includes one or more processor(s) 109, interface(s) 110, and a memory, such as a memory 112, coupled to the processor(s) 109. The processor(s) 109 can be a single processing unit or a number of units, all of which could include multiple computing units. The processor(s) 109 may be implemented as one or more microprocessors, microcomputers, microcontrollers, digital signal processors, central processing units, state machines, logic circuitries, and/or any devices that manipulate signals based on operational instructions. Among other capabilities, the processor(s) 109 is configured to fetch and execute computer-readable instructions and data stored in the memory 112.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included. The interface(s) 110 may include a variety of software and hardware interfaces, for example, interfaces for peripheral device(s), such as a keyboard, a mouse, an external memory, and a printer. The interface(s) 110 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 110 may include one or more ports for connecting a number of client devices 104 to each other or to another system, such as the watermarking system 102. In one implementation, the watermarking system 102 communicates with the client devices 104 via the interfaces 110.

The memory 112 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. The memory 112 also includes modules 114 and data 116.

The modules 114, amongst other things, include routines, programs, objects, components, data structures, etc., which perform particular tasks or implement particular abstract data types. The modules 114, includes a segmenting module 118, watermark generation module 120, a processing module 122, an insertion module 124, a template generation module 126, a peak-to-sidelobe-ratio module 128, a run length computing module 130, a post-processing module 132, and other module(s) 134. The other module(s) 134 may include programs or coded instructions that supplement applications and functions of the watermarking system 102.

On the other hand, the data 116, inter alia serves as a repository for storing data processed, received, and generated by one or more of the modules 114. The data 116 includes for example, user data 136, watermark data 138, media data 140 and other data 142. The other data 142 includes data generated as a result of the execution of one or more modules in the other module(s) 134.

In one implementation, the watermarking system 102 performs embedding and extraction of a watermark from digital media such that extraction of watermark is robust to the modifications/alterations made to the watermark and to find the pirate. The watermarked digital media may be copied, or illegally used by a pirate by way of different attacks or operations, such as cropping, compression, rotation, scaling, and so on. As a result of such actions, the watermark embedded to the digital media may be altered or modified. In operation, according to an implementation of the present subject matter, user information is obtained from user data 136 to generate a unique watermark ID. The user information may include name, address, account number, photograph, and the like. Since the watermark ID is unique for each user, it would be understood that different users, for different digital media, would have different watermark ID. It would also be understood that in one implementation, for different digital media owned by one user, a similar watermark ID may be generated and associated with the user based on his personal information. In another implementation, the watermark ID may be generated for individual users randomly. The generated watermark ID can be a random pattern. A random pattern, for example may be made of bit(s) or cluster of bits. A bit can be '0' or '1'. Further, in one implementation, each bit of watermark ID may be a symbol of P bits to signify $2^P$ different possible combinations. Since each bit of the watermark ID may be a symbol of P bits, based on $2^P$ possible combinations, a random pattern from among $2^P$ random patterns may be indicated by the symbol for embedding into the digital media.

In one implementation, the watermark generation module 120 is configured to generate the watermark ID. In another implementation, the watermark generation module 120 may also encode the generated watermark ID. The watermark ID may be encoded using error correction coding to prevent the watermark from getting destroyed when subjected to the attacks by the pirate. Although, it is possible that the watermark may be encoded, the description henceforth has been explained based on un-encoded watermark ID.

In one implementation, the watermark generation module 120 is configured to generate multiple random patterns. The generated random patterns may include at least a primary random pattern and a secondary random pattern. According to one implementation of the present subject matter, the random patterns are highly auto correlated and have substantially zero cross correlation.

In one implementation, the processing module 122 is configured to convert the primary random pattern and the secondary random pattern to primary bipolar random pattern and secondary bipolar random pattern respectively. In another implementation, the processing module 122 is further configured to multiply the generated bipolar random patterns by a weighing factor 'α', where α is watermark strength factor to enhance the potency of the primary bipolar random pattern and the secondary bipolar random pattern against modifications/alterations (attacks).

In another implementation, one or more of the primary bipolar random pattern and the secondary bipolar random pattern may be embedded in the digital media as the watermark according to the watermark ID. For example, if the watermark ID includes a bit '0', the primary bipolar random pattern may be embedded to the digital media, and if the watermark ID includes a bit '1', the secondary bipolar random pattern may be embedded to the digital media. The digital media in which the bipolar patterns may be embedded can be segmented based on the different techniques, such as the ones described in the following embodiments.

In one implementation, the segmenting module 118 of the watermarking system 102 is configured to segment digital media to which the one or more of the primary bipolar random pattern and the secondary bipolar random pattern may be embedded. In said implementation, the digital media may be segmented into frames where the dimensions of each frame are equal. In another implementation, digital media may be segmented into multiple frames and each frame may further be segmented into multiple set of subframes of equal dimensions. For reference purposes, such segmentation of digital media into subframes has been considered hereinafter for the sake of explanation of the description.

In said implementation, the dimensions of each subframe are equal to the size of the primary bipolar random pattern and the secondary bipolar random pattern. In another implementation, the primary bipolar random pattern and the secondary bipolar random pattern are arranged in 1D or 2D format to suit the subframe dimensions.

In one example, a digital video may be segmented into 10 frames. Each of the 10 frames may further be segmented into 200 subframes. As described above, the dimensions of each frame of the 10 frames and the subsequent 200 subframes may be equal. Although it has been described in the example, the segmenting module 118 segments digital video into frames, however, it would be understood by those skilled in the art that any form of digital media may be segmented by the segmenting module 118. For the sake of clarity, the set of successive frames are referred to as successive N subframes, hereinafter.

As explained before, according to an implementation of the present subject matter, the generated primary random pattern and the secondary random pattern may be converted to the primary bipolar random pattern and the secondary bipolar random pattern, which may be then be multiplied with a watermark strength factor 'α'. The watermark strength factor 'α' enhances the potency of the primary bipolar random pattern and the secondary bipolar random pattern against attacks. In one implementation, the primary bipolar random pattern and the secondary bipolar random pattern may be embedded into the segmented digital media based on the following relation:

$$X = x + \alpha * w1 \text{ if bit} = '0' \quad (1)$$

$$X = x + \alpha * w2 \text{ if bit} = '1' \quad (2)$$

In the above mentioned relations (1) and (2), X represents the watermarked digital media, α represents watermark strength factor and, w1 and w2 represents primary bipolar random pattern and secondary bipolar random pattern respectively. Further, x represents the segmented digital media to be watermarked and bit '0' and bit '1' are the bits of the watermark ID. As shown in the above relation (1), if the watermark bit is '0', then primary bipolar random pattern (w1) is multiplied with the watermark strength factor (α) and embedded into segmented digital media (x) to obtain watermarked digital media (X). Similarly, as shown in the above relation (2), if the watermark bit is '1', secondary bipolar random pattern (w2) is multiplied with the watermark strength factor (a) and embedded into segmented digital media (x) to obtain watermarked digital media (X). The embedding of one or more of the primary bipolar random pattern and the secondary bipolar random pattern into the segmented digital media can be based on different techniques, such as the ones described. Although, it has been described that primary bipolar random pattern and secondary bipolar random pattern may be embedded to the digital media based on the watermark ID bit '0' and '1' however, in another implementation, $2^P$ different random patterns may be embedded to the digital media based on a symbol of P bits signifying $2^P$ combinations.

In an implementation, the insertion module 124 is configured to insert/embed one or more of the primary bipolar random pattern and the secondary bipolar random pattern as the watermark based on the watermark ID to some of the successive subframes, say N, of the segmented digital media and leave another N successive subframes unaltered (buffer segment). Upon leaving the N successive subframes, one ore more of the primary bipolar random pattern and the secondary bipolar random pattern may again be embedded to successive N subframes. The above described implementation is advantageous against the effect of frame drop attack as well as other attacks, as even if some of the subframes are dropped from the segmented digital media, determination of the embedded watermark may still be effectively made with respect to the watermarked digital media. Although, it has been described that one or more of the primary bipolar random pattern and secondary bipolar random pattern may be embedded to the segmented digital media based on the watermark ID however, in another implementation, one or more of the primary bipolar random pattern and secondary bipolar random pattern may be embedded to the segmented digital media based on the encoded watermark ID to reduce the bit error rate while extracting the watermark ID.

For example, in one implementation, the watermark ID generated for a user can be 0011. Accordingly, one or more of the primary bipolar random pattern and the secondary bipolar random pattern may be embedded to the segmented digital media, to be provided to the user. Since the first bit of watermark ID is '0', the primary bipolar random pattern may be embedded in successive N subframes and buffer segment of segmented digital media can be left unaltered. Then again a primary bipolar random pattern may be embedded in some of the next successive N subframes as the next bit is also '0' and buffer segment of segmented digital media may be left unaltered. Since the next bit is '1', the secondary bipolar random pattern may be embedded in next successive N subframes and buffer segment of segmented digital media may be left unaltered. Finally, secondary bipolar random pattern may embedded in some of the next successive subframes N as the next bit of the watermark ID is '1' to obtain the watermarked digital media. Although it has been described that the primary bipolar random pattern is associated with the bit '0' of the watermark ID and secondary bipolar random pattern is associated with the bit '1' of the watermark ID, the association of the bipolar random sequences may also be vice-versa where bit '0' of the watermark ID is associated with the secondary bipolar random sequence and, the bit '1' of the watermark ID is associated with the primary bipolar random sequence.

The watermarked digital media may be copied, or illegally used by a pirate by way of different attacks or operations, such as cropping, compression, rotation, scaling, and so on. As a result of such actions, the watermark embedded to the digital media may be altered or modified. Therefore, to identify an illegally distributed or copied digital media, the watermarks embedded to the digital media that has been subjected to attack are extracted. In one implementation, based on the extracted watermark, a possible watermark ID based on which the digital media could have been watermarked is computed. In situations where the computed watermarked ID for the digital media is different from the unique watermark ID of the digital media, a pirate may be identified.

In operation, according to one implementation of the present subject matter, the template generation module 126 is configured to analyze the watermarked digital media. The analysis of watermarked digital media is done to analyze if there are any attacks operated on the watermarked digital media by a pirate. The attacks are estimated by comparing un-watermarked digital media, and the watermarked digital media provided to the users. In one example, the watermark of the watermarked digital video may be altered either due to attacks by a pirate or, due to some post-processing operations such as cropping, frame dropping, scaling, compression, frame rate change and the like, which may also act as attacks on the watermarked digital media. Due to these attacks, embedded watermark to the frames of the digital media may get removed or be altered. Hence, the watermarked digital media is compared with the un-watermarked digital media, to compute if the attacks are subjected on the watermarked digital media.

As described before, during the process of watermark embedding, one or more of the primary bipolar random pattern and the secondary random patterns may be embedded as watermarks to the segmented digital media. Since one or more of the primary bipolar random pattern and the secondary bipolar random pattern is embedded based on the watermark ID, the bipolar random patterns existing as watermark in the watermarked digital media are identified. The bipolar random patterns may be precisely identified against the attacks such as frame dropping, frame rate change, rotation, scaling, cropping, filtering and the like to robustly extract the watermark ID from the watermarked digital media.

To accurately identify these bipolar random patterns used as the watermark in the watermarked digital media and deduce a corresponding watermark ID, the template generation module 126 is configured to generate a primary template and a secondary template corresponding to the primary bipolar random pattern and the secondary bipolar random patterns used as the watermark in the watermark digital media. To generate the primary template and the secondary template, the template generation module 126 is configured to process the primary bipolar random pattern and the secondary bipolar random pattern in a manner such that the correlations yield a high peak-to-sidelobe-ratio (PSR) for the computed attacks estimated during the analysis.

In one implementation, the peak-to-sidelobe-ratio module 128 is configured to correlate the generated primary template and the secondary template with the subframes of watermarked digital media to compute the PSR with respect to each primary template and secondary template, respectively. The PSR of the correlation may allow the peak-to-sidelobe-ratio module 128 to identify the embedded bipolar random pattern to the subframes of the watermarked digital media. In other words, peak-to-sidelobe-ratio module 128 may be configured to detect the one or more of the primary bipolar random pattern and the secondary bipolar random pattern embedded in subframes of the segmented digital media based on the computed PSR, i.e., whether the primary bipolar random pattern or the secondary bipolar random pattern are embedded in the subframes of the watermarked digital media.

In operation, if PSR of the correlation between a subframe and the primary template is higher than the PSR of correlation between the subframe and the secondary template, it is determined by the peak-to-sidelobe-ratio module 128 that the primary bipolar random pattern was embedded to the subframe of the watermarked digital media. Similarly, if PSR of the correlation between a subframe and the secondary template is higher than the PSR of correlation between the subframe and the primary template, it is determined by the peak-to-sidelobe-ratio module 128 that the secondary bipolar random pattern was embedded to the subframe of the watermarked digital media. Since one bipolar random pattern is embedded to successive N subframes, the peak-to-sidelobe-ratio module 128 may be configured to determine the embedded primary bipolar random pattern or the secondary bipolar random pattern to the watermarked digital media for the successive N subframes of the watermarked digital media.

As described before, for embedding of one or more of the primary bipolar random pattern and the secondary bipolar random pattern based on the watermark ID to the segmented digital media, N successive subframes are chosen while leaving the next successive N frames, referred to as buffer segment. Therefore, determination of one or more of the primary random pattern and the secondary random pattern may only be possible for the embedded subframes and not the buffer segment in which no watermark is embedded. Hence, the peak-to-sidelobe-ratio module 128 may also determine the PSR strength of each correlation prior to determination of presence of one or more of the primary bipolar random pattern and the secondary bipolar random pattern. PSR strength below a pre-defined PSR strength threshold may signify presence of a buffer frame in which case, presence of no embedded watermark, neither the primary bipolar random pattern nor the secondary bipolar random pattern may be determined.

In one implementation, the pre-defined PSR strength threshold may be based on empirical results. However, in another implementation, a fraction of the minimum PSR strength required for correct determination maybe utilized to determine the pre-defined PSR strength. For example, a digital video may be segmented into 20 frames. Each of the 20 frames may further be segmented into 10 subframes such that there are a total of 200 subframes. Primary template and the secondary template are correlated with subframes to determine respective PSRs and correspondingly identify which of the primary bipolar random pattern and the secondary bipolar random pattern is embedded in subframes of the watermarked digital media. Some of the successive subframes may be buffer segment; hence, for these buffer segments neither the primary bipolar random pattern nor the secondary bipolar random pattern may be determined. Accordingly, the one or more of the primary bipolar random pattern and the secondary bipolar pattern may be determined in all the subframes of the watermarked digital media. In another embodiment, the run length computing module 130 is configured to compute run lengths to eliminate the need to identify exactly N subframes with one particular bipolar random pattern for the extraction of watermark ID. The run lengths allow determination of the primary bipolar random pattern or the secondary bipolar random pattern in N successive subframes even in situations where one of either the primary or the secondary bipolar random pattern is not detected for the entire N successive subframes.

For example, if the run length of the detected primary bipolar random pattern or the secondary bipolar random pattern is large, irrespective of the size of successive N subframes of the watermarked digital media, the primary bipolar random pattern or the secondary bipolar random pattern may be detected. In one implementation, run lengths greater than 50% of successive N subframes of the watermarked digital media are identified as threshold for determining either the presence of primary or the secondary bipolar random pattern. Hence, the run length computing module 130 may also determine a run length threshold. In one implementation, the run length threshold may be 50% of the length of N successive subframes, or based on empirical results.

Furthermore, based on the run length, one of the bipolar random patterns embedded to N successive subframes is determined to deduce the bit of the watermark ID used for embedding the bipolar random pattern. In one implementation, run length computing module 130 is configured to determine the bit of watermark ID from each successive N subframes of watermarked digital media. If the run length of primary template is greater than run length threshold, then primary bipolar random pattern may be detected in successive N subframes of watermarked digital media and bit '0' of watermark ID may be determined. If the run length of secondary template is greater than run length threshold, then secondary bipolar random pattern may be detected in successive N subframes of segmented watermarked digital media and watermark bit '1' of watermark ID may determined. In one implementation, bit of watermark ID may be based on the following relation:

$$\text{If } R_A > 0.5 * R_E \text{ then bit}='0' \quad (3)$$

$$\text{If } R_B > 0.5 * R_E \text{ then bit}='1' \quad (4)$$

In the above mentioned relations (3) and (4), $R_A$ represents run length of primary template, $R_B$ represents run length of secondary template and $R_E$ represents effective run length. As shown in relation (3), if run length of primary template is larger than result of multiplication of 0.5 to effective run length, bit '0' of the watermark ID may be determined from the successive N subframes of watermarked digital media. Similarly, as shown in relation (4), if run length of secondary template is larger than result of multiplication of 0.5 to effective run length, then watermark bit '1' may be determined from the successive N subframes of watermarked digital media.

In one implementation, the post-processing module 132 is configured to process the run lengths such that spurious detection of templates with small PSRs is eliminated before a watermark ID bit is deduced from the run lengths and arrange all the deduced bits to extract watermark ID. In another implementation, the post-processing module 132 may also decode the identified watermark ID to extract the actual un-encoded watermark ID.

For example, if there are 200 subframes and out of the 200 subframes, 100 subframes were watermarked and 100 subframes were left as buffer segments, during the detection either the primary template or the secondary template corresponding to which the presence of primary bipolar random pattern or the secondary bipolar pattern may be detected in the successive N subframes of the watermarked digital media.

It may happen that due to various attacks, the detected primary template or the secondary template for a subframe or a group of subframes is incorrect when compared to the actual bipolar random pattern embedded in the subframes during embedding. For example, the run lengths of primary template for the 100 subframes may be sparse as 50, 30, and 10 where as the run length of the secondary template for the same 100 subframes may be sparse as 8, 2, where the actual sequence of primary and secondary template detected for the 100 subframes is $50_p, 8_s, 30_p, 2_s, 10_p$. Therefore, run lengths 8 and 2 are neglected and the primary bipolar random pattern is detected in the 100 successive subframes. Based on the detection of the template, watermark ID bit is deduced corresponding to the primary bipolar random pattern. Similarly, all the watermark ID bits are deduced for different successive subframes and, arranged to extract the watermark ID. As described earlier, one or more of the primary bipolar random pattern and secondary bipolar random pattern may also be embedded to the segmented digital media based on the encoded watermark ID instead of the un-encoded watermark ID to prevent the watermark from getting destroyed when subjected to attacks by pirate, in such situation the identified watermark ID may be may be decoded to extract the actual un-encoded watermark ID.

Figure 2A:
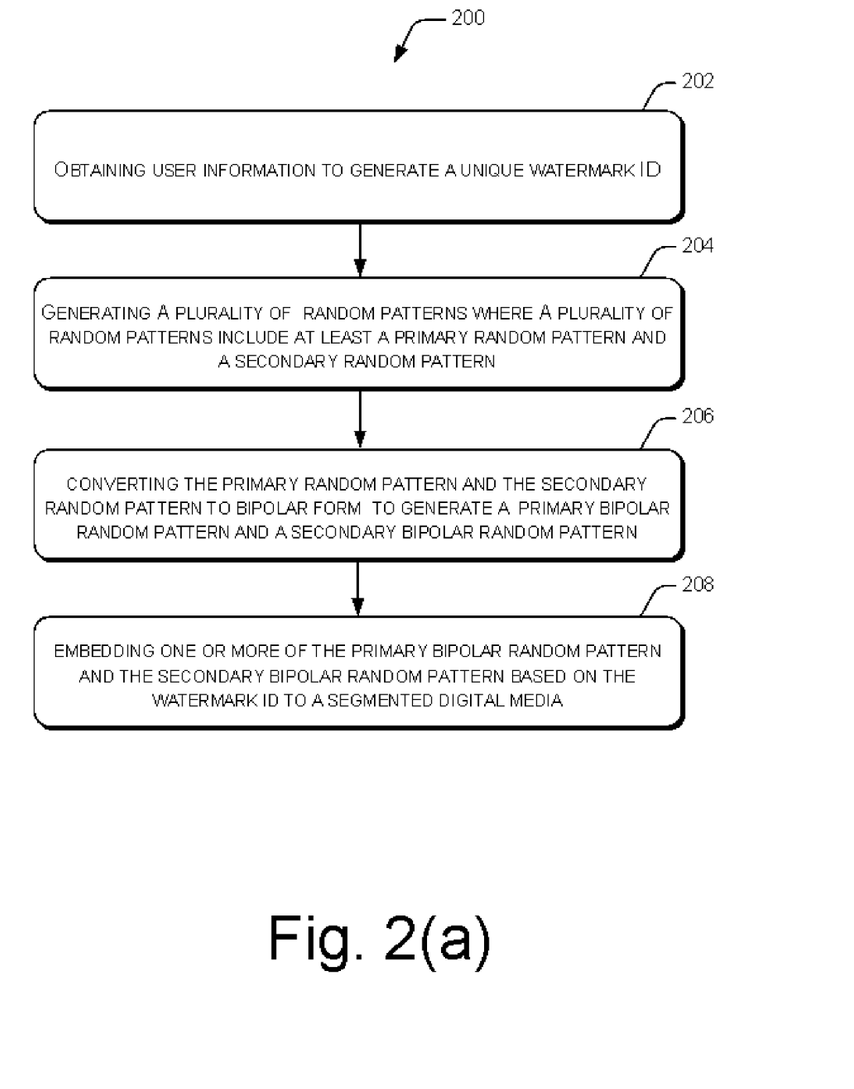
FIG. 2(a) illustrates a method for embedding a watermark in a digital media, in accordance with an implementation of the present subject matter.
Figure 2B:
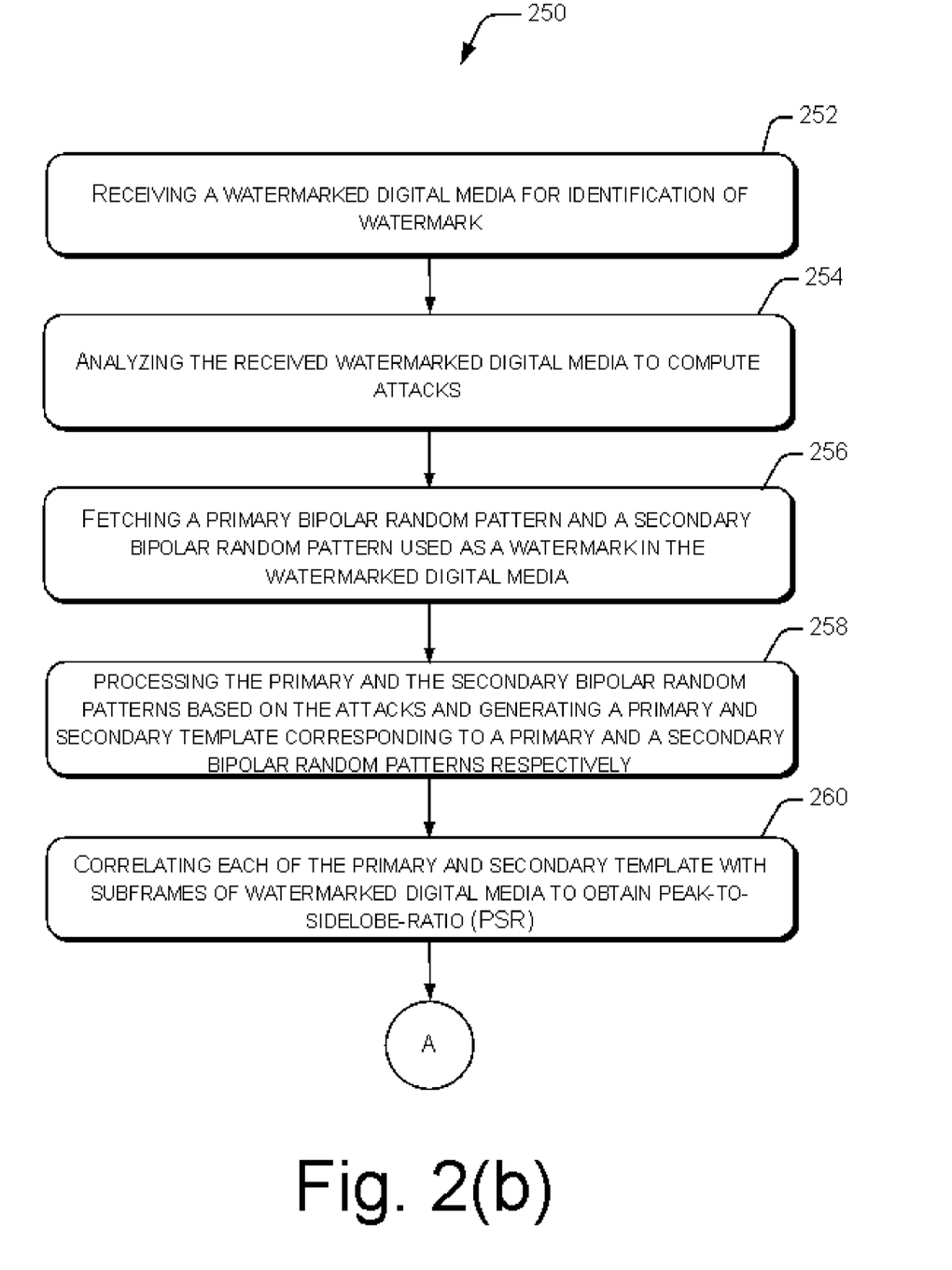
FIG. 2(b) illustrates a method for extracting a watermark from a digital media, in accordance with an implementation of the present subject matter.

FIGS. 2(a) and 2(b) illustrates methods 200 and 250 for watermarking a digital media including watermark embedding and watermark extracting from digital video in accordance with an embodiment of the present subject matter. According to an aspect, the concepts of watermarking a digital media are described with reference to the watermarking system 102 described above.

The methods may be described in the general context of computer executable instructions. Generally, computer executable instructions can include routines, programs, objects, components, data structures, procedures, modules, functions, etc., that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices, CDROM, DVD, BLURAY, flash drives, hardisk, tapes, and private networks.

The order in which the methods are described is not intended to be construed as a limitation, and any number of the described method blocks can be combined in any order to implement the method 200 and 250, or an alternative method. Additionally, individual blocks may be deleted from the methods without departing from the spirit and scope of the subject matter described herein. Furthermore, the methods 200 and 250 can be implemented in any suitable hardware, software, firmware, or combination thereof. The methods 200 and 250 are explained with reference to the watermarking system 102, however, it will be understood that the methods can be implemented in other systems as well.

Referring to method 200, at block 202, user information is obtained to generate a watermark ID. A unique watermark ID is generated for each user. The watermark ID may be a random pattern. A random pattern can be made of bit(s) or group of bits where each bit may be '0' or '1.' User information, as described earlier, is information that user intents to embed into the digital media. In one example, user information includes, but is not limited, name and contact number to obtain copyright protection the digital media by embedding name and contact number into the segmented digital media. In one implementation, the data 116 stores information of user, information related to digital media, watermark related information and other information.

At block 204, a plurality of random patterns may be generated. In one implementation of the present subject matter, plurality of random patterns includes at least a primary random pattern and a secondary random pattern. The generated random patterns may be of the same size as the dimensions of the subframes of the segmented digital media. The generated primary random pattern and the secondary bipolar random pattern may be converted into bipolar form and then can be embedded in the segmented digital media based on the generated watermark ID. In one implementation, the watermark generation module 120 is configured to generate the multiple random patterns.

At block 206, the primary random pattern and the secondary random pattern may be converted to bipolar form. In one implementation, the primary random pattern and the secondary random pattern may be converted to bipolar random patterns to generate a primary bipolar random pattern and a secondary bipolar random pattern respectively. In one implementation, the processing module 122 may convert the primary random pattern and the secondary random pattern to bipolar random patterns.

At block 208, one or more of the primary bipolar random pattern and the secondary bipolar random pattern may be embedded into the segmented digital media. Based on the generated watermark ID, one or more of the primary bipolar random pattern and the secondary bipolar random pattern may be embedded as a watermark in the segmented digital media. For example, if the watermark bit is '0', primary bipolar random pattern may be embedded to the segmented digital media to obtain watermarked digital media and if the watermark ID bit is '1' secondary bipolar random pattern may be embedded into segmented digital media to obtain watermarked digital media. In one implementation, the insertion module 124 inserts one or more of the primary bipolar random pattern and the secondary bipolar random pattern into the segmented digital media based on the generated watermark ID. Although, it has been described that one or more of the primary bipolar random pattern and secondary bipolar random pattern may be embedded to the segmented digital media based on the watermark ID however, in another implementation, one or more of the primary bipolar random pattern and secondary bipolar random pattern may be embedded to the segmented digital media based on the encoded watermark ID to reduce the bit error rate while extracting the watermark ID.

Referring to FIG. 2(b), at block 252, a watermarked digital media for identification of watermark may be received. The watermarked digital media may have undergone some watermark removal attacks by a pirate or some operations such as cropping, frame drop, compression, rotation, scaling and on the like. The above mentioned processes lead to degradation of quality of watermarked digital media and also watermark elimination from the watermarked digital media. Therefore, by detecting the watermark, pirate may be identified.

At block 254, the received watermarked digital media is analyzed to compute the attacks that may have operated on the watermarked digital media by the pirate. In one implementation, the watermarked digital media is compared to un-watermarked digital media to estimate the attacks. For example, one or more of the primary bipolar pattern and the secondary bipolar pattern used as the watermark in the watermarked digital media may be altered due to some attacks such as frame dropping, scaling, filtering, frame rate change, compression and the like. In one implementation, the template generation module 126 analyzes the watermarked digital media.

At block 256, at least the primary bipolar random pattern and the secondary bipolar random pattern are fetched. In one implementation, the primary bipolar random pattern and the secondary bipolar random pattern used as the watermark in the watermarked digital media are fetched. In one implementation, the template generation module 126 fetches a primary bipolar random pattern and a secondary bipolar random pattern used as the watermark in the watermarked digital media from the watermark data 138 of the watermarking system 102.

At block 258, the fetched primary bipolar random pattern and the secondary bipolar random pattern are processed based on the computed attacks estimated during analysis of the watermarked digital media that may have modified/altered the watermarked digital media. The computed attacks may include, but are not limited, cropping, rotation, scaling, frame dropping, frame rate change, filtering and the like. Furthermore, at block 258 a primary template and a secondary template may be generated. A primary template and a secondary template may be generated corresponding to the processed primary bipolar random pattern and the secondary bipolar random pattern respectively. In one implementation, the template generation module 126 generates a primary template and a secondary template.

At block 260, each of the generated primary template and the secondary template may be correlated with subframes of the watermarked digital media to compute the PSR with respect to each primary template and the secondary template, respectively. The PSR may be computed to identity one of the primary bipolar random pattern and the secondary bipolar random pattern embedded in the watermarked digital media.

Furthermore, PSR threshold may be estimated to signify the presence of buffer segment as one or more of the primary bipolar pattern and the secondary bipolar pattern may not be embedded in the segmented digital media. In one implementation, the peak-to-sidelobe-ratio module 128 correlates the primary template and the secondary template with the subframes of the watermarked digital media to compute the PSR and estimate PSR threshold.

Figure 2C:
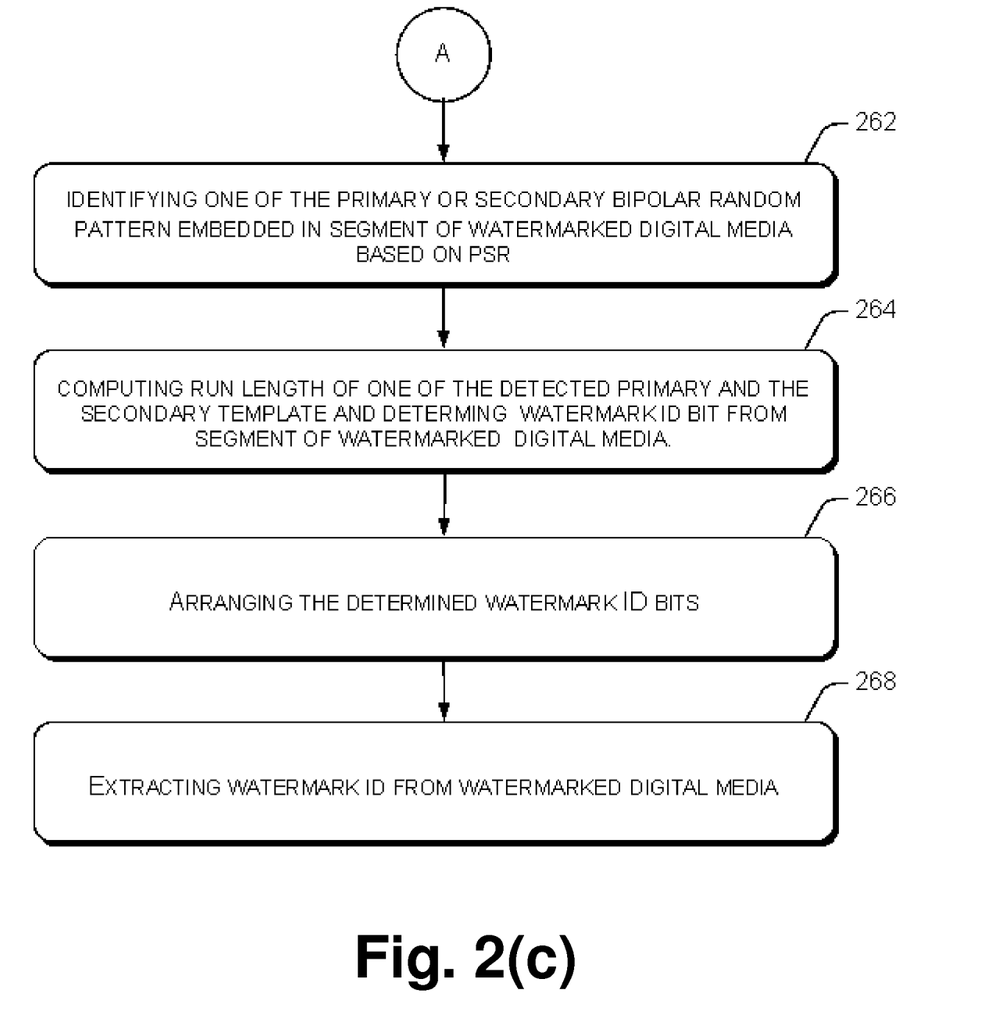
FIG. 2(c) illustrates a method, in accordance with an implementation of the present subject matter.

Referring to FIG. 2(c), at block 262, one of the primary bipolar random pattern and the secondary bipolar random pattern existing as watermark in the segment of subframes of the watermarked digital media is identified. If PSR of the correlation between the segment and the primary template is higher than the PSR of correlation between the segment and the secondary template, it is determined that the primary bipolar random pattern may be embedded to the segment of the watermarked digital media. Similarly, if PSR of the correlation between the segment and the secondary template is higher than the PSR of correlation between the segment and the primary template, it is determined that the secondary bipolar random pattern may be embedded to the segment of the watermarked digital media.

Accordingly, the primary bipolar random pattern or the secondary bipolar random pattern used as the watermark in the watermarked digital media may be identified. Identification of one or more of the primary bipolar random pattern and the secondary bipolar random pattern may only be possible for the embedded segments and not the buffer segment in which no watermark is embedded. Therefore, at block 262, buffer segment may be identified, indicating the absence of the primary bipolar random pattern and the secondary bipolar random pattern in the buffer segment of the watermarked digital media. In one implementation, the peak-to-sidelobe-ratio module 128 identifies the embedded one or more of the primary random pattern and the secondary random pattern in the segments of the watermarked digital media.

At block 264, run length of one of the primary or the secondary template for which the primary bipolar random pattern or the secondary bipolar random pattern may be detected in the segment of watermarked digital media is computed. Furthermore, at block 262, the bit of watermark ID is determined from segment of watermarked digital media. In one implementation, the run length computing module 130 computes run length of one of the primary template or the secondary template and determines the watermark ID bit embedded in segment of watermarked digital media. In one implementation, if the run length of primary template is greater than run length threshold, then primary bipolar random pattern is detected in segment of watermarked digital media and watermark bit '0' of watermark ID is determined. If the run length of secondary template is greater than run length threshold, then secondary bipolar random pattern is detected in segment of digital media and watermark bit '1' of watermark ID is determined.

At block 266, the determined watermark bits are arranged. The run lengths are processed such that spurious detection of templates with small PSRs is eliminated before a watermark ID bit is deduced from the run lengths and the deduced watermark ID bits are arranged. For example, if there are 200 subframes and out of the 200 subframes, 100 subframes were watermarked and 100 subframes were left as buffer segments, during the detection either the primary template or the secondary template corresponding to which the presence of primary bipolar random pattern or the secondary bipolar random pattern may be detected in the successive N subframes of the watermarked digital media. It may happen that due to various attacks, the detected primary template or the secondary template for a subframe or a group of subframes is incorrect when compared to the actual bipolar random pattern embedded in the subframes during embedding. For example, the run lengths of primary template for the 100 subframes may be sparse as 50, 30, and 10 whereas the run length of the secondary template for the same 100 subframes may be sparse as 8, 2, where the actual sequence of primary and secondary template detected for the 100 subframes is $50_p$, $8_s$, $30_p$, $2_s$, $10_p$. Therefore, run lengths 8 and 2 are neglected and the primary bipolar random pattern is detected in the 100 successive subframes. Based on the detection of the template, watermark ID bit is deduced corresponding to the primary bipolar random pattern. Similarly, all the watermark ID bits are deduced for different successive subframes and, arranged to extract the watermark ID.

At block 268, the detected watermark bits are arranged to obtain the watermark ID. In one implementation, post-processing module 132 extracts the watermark ID and identifies the pirate. For example, if the primary bipolar random pattern is identified in successive N subframes of a watermarked digital media and, consecutively after the buffer segments the secondary bipolar random pattern is identified in successive N subframes, in such a situation the watermark bits 0 and 1 are deduced corresponding to the identified bipolar random patterns. If the same pattern is identified for next subframes, the deduced watermark bits are arranged to extract the watermark ID as "0101". As described earlier, one or more of the primary bipolar random pattern and secondary bipolar random pattern may also be embedded to the segmented digital media based on the encoded watermark ID instead of the un-encoded watermark ID to prevent the watermark from getting destroyed when subjected to attacks by pirate, in such situation the identified watermark ID may be may be decoded to extract the actual un-encoded watermark ID.

Although embodiments for methods and systems for watermark embedding and extracting from digital media have been described in a language specific to structural features and/or methods, it is to be understood that the invention is not necessarily limited to the specific features or methods described. Rather, the specific features and methods are disclosed as exemplary embodiments for watermark embedding and extracting from digital media.

We claim:

1. A method for embedding a watermark in a digital media, the method comprising:
   generating a plurality of random patterns, wherein the plurality of random patterns include at least a primary random pattern and at least a secondary random pattern, and wherein the plurality of random patterns is indicative of watermark to be embedded in the digital media;
   converting at least the primary random pattern and at least the secondary random pattern to a bipolar form, wherein the primary random pattern and the secondary random pattern are converted to a primary bipolar random pattern and a secondary bipolar random pattern respectively; and
   embedding at least one of the primary bipolar random pattern and the secondary bipolar random pattern in the digital media as the watermark, wherein the watermark is based on a watermark ID, and wherein the watermark ID is a random pattern.

2. The method as claimed in claim 1, wherein the method further comprises segmenting the digital media into a plurality of subframes to embed watermark.

3. The method as claimed in claim 1, wherein the method further comprises generating the watermark ID based on user information, and wherein the user information includes at least one of a name, an address, a contact number, and an image associated with a user.

4. The method as claimed in claim 3, wherein the method further comprises encoding the watermark ID using error correction coding.

5. The method as claimed in claim 1, wherein the plurality of random patterns comprise at least one of a bit and group of bits, and wherein a bit is at least one of 0 and 1.

6. The method as claimed in claim 5, wherein the generated plurality of random patterns are non-correlated.

7. A method for extracting a watermark from a watermarked digital media, the method comprising:
    processing a primary bipolar random pattern and a secondary bipolar random pattern based on attacks made to the watermarked digital media to generate a primary template and a secondary template respectively wherein at least one of the primary bipolar random pattern and the secondary bipolar random pattern are embedded as the watermark in the watermarked digital media;
    correlating the primary template and the secondary template with at least one subframe of the watermarked digital media to compute a peak-to-side lobe-ratio (PSR) with respect to each of, the primary template and the secondary template; and
    detecting at least one of the primary bipolar random pattern and the secondary bipolar random pattern embedded as watermark in the at least one subframe of the watermarked digital media based on the computed PSR to extract a watermark ID, wherein the watermark ID is used to watermark a digital media to generate the watermarked digital media.

8. The method as claimed in claim 7, wherein the attacks comprise at least one of frame dropping, scaling, cropping, filtering and frame rate change.

9. The method as claimed in claim 7, wherein the method further comprises determining run length of at least one of the detected primary template and the secondary template for a set of successive subframes to identify a watermark bit associated with the watermark.

10. The method as claimed in claim 9, wherein the method further comprises collating the watermark bit of at least one set of successive subframes to extract the watermark ID.

11. The method as claimed in claim 10, wherein the method further comprises decoding the extracted watermark ID to extract the actual watermark ID.

12. The method as claimed in claim 7, wherein detecting comprises:
    comparing PSR of the primary template and the secondary template to select at least one of the primary template and the secondary template with greater PSR; and
    identifying at least one of the primary bipolar random pattern and the secondary bipolar random pattern embedded as the watermark in the watermarked digital media based on a comparison of the PSR of the selected template with a threshold.

13. A watermarking system for embedding and extracting a watermark from a digital media, the watermarking system comprising:
    a processor;
    a memory coupled to the processor, the memory comprising:
        a watermark generation module configured to generate a plurality of random patterns, wherein the plurality of random patterns include at least a primary random pattern and at least a secondary random pattern, and wherein the plurality of random patterns is indicative of watermarks to be embedded to the digital media;
        a processing module configured to convert the primary random pattern and the secondary random pattern to a bipolar form, wherein the primary random pattern and the secondary random pattern are converted to a primary bipolar random pattern and a secondary bipolar random pattern respectively; and
        an insertion module configured to insert at least one of the primary bipolar random pattern and at least one the secondary bipolar random pattern in the digital media as the watermark, wherein the watermark is based on a watermark ID, and wherein the watermark ID is a random pattern.

14. The watermarking system as claimed in claim 13, wherein the memory further comprises:
    a template generation module configured to process a primary bipolar random pattern and a secondary bipolar random pattern based on attacks made to the watermarked digital media to generate a primary template and a secondary template respectively, wherein at least one of the primary bipolar random pattern and the secondary bipolar random pattern are used as watermark in the watermarked digital media;
    a peak-to-sidelobe-ratio module configured to:
        correlate the primary template and the secondary template with at least one subframe of the watermarked digital media to compute a peak-to-side lobe-ratio (PSR) with respect to each of, the primary template and the secondary template; and
        detect at least one of the primary bipolar random pattern and the secondary bipolar random pattern used as the watermark in at least one subframe of the watermarked digital media based on the computed PSR to extract a watermark ID, wherein the watermark ID is used to watermark a digital media to generate the watermarked digital media.

15. The watermarking system as claimed in claim 14, wherein the memory further comprises a run length computing module configured to determine run length of at least one of the detected primary template and the secondary template for a set of successive subframes to identify a watermark bit associated with the embedded watermark.

16. The watermarking system as claimed in claim 14, wherein the memory further comprises a post-processing module is configured to collate the watermark bit of at least one set of successive subframes to extract the watermark ID.

17. The watermarking system as claimed in claim 13, the memory further comprises a segmenting module configured to segment the digital media into a plurality of subframes to embed watermark.

18. The watermarking system as claimed in claim 13, wherein the watermark ID is generated based on user information, and wherein the user information includes one or more of a name, an address, a contact number, and an image associated with a user.

19. A non-transitory computer-readable medium having embodied thereon a computer program for executing a method comprising:
    generating a plurality of random patterns, wherein the plurality of random patterns include at least a primary random pattern and at least a secondary random pattern, and wherein the plurality of random patterns is indicative of watermark to be embedded in the digital media;
    converting at least the primary random pattern and at least the secondary random pattern to a bipolar form, wherein the primary random pattern and the secondary random pattern are converted to a primary bipolar random pattern and a secondary bipolar random pattern respectively;

embedding at least one of the primary bipolar random pattern and the secondary bipolar random pattern in the digital media as the watermark, wherein the watermark is based on a watermark ID, and wherein the watermark ID is a random pattern;

processing a primary bipolar random pattern and a secondary bipolar random pattern based on attacks made to the watermarked digital media to generate a primary template and a secondary template respectively wherein at least one of the primary bipolar random pattern and the secondary bipolar random pattern are embedded as the watermark in the watermarked digital media;

correlating the primary template and the secondary template with at least one subframe of the watermarked digital media to compute a peak-to-side lobe-ratio (PSR) with respect to each of, the primary template and the secondary template; and detecting at least one of the primary bipolar random pattern and the secondary bipolar random pattern embedded as watermark in the at least one subframe of the watermarked digital media based on the computed PSR to extract a watermark ID, wherein the watermark ID is used to watermark a digital media to generate the watermarked digital media.

\* \* \* \* \*